May 18, 1965
C. W. TITTLE
3,184,598
RADIOACTIVE WELL LOGGING METHOD
Filed May 17, 1954
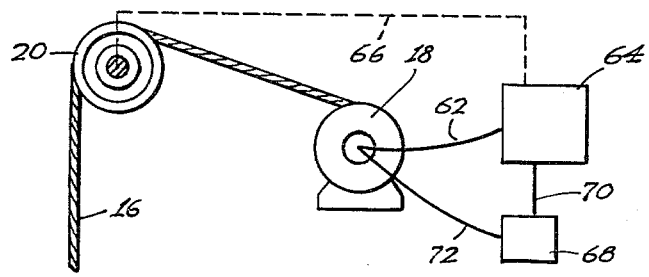
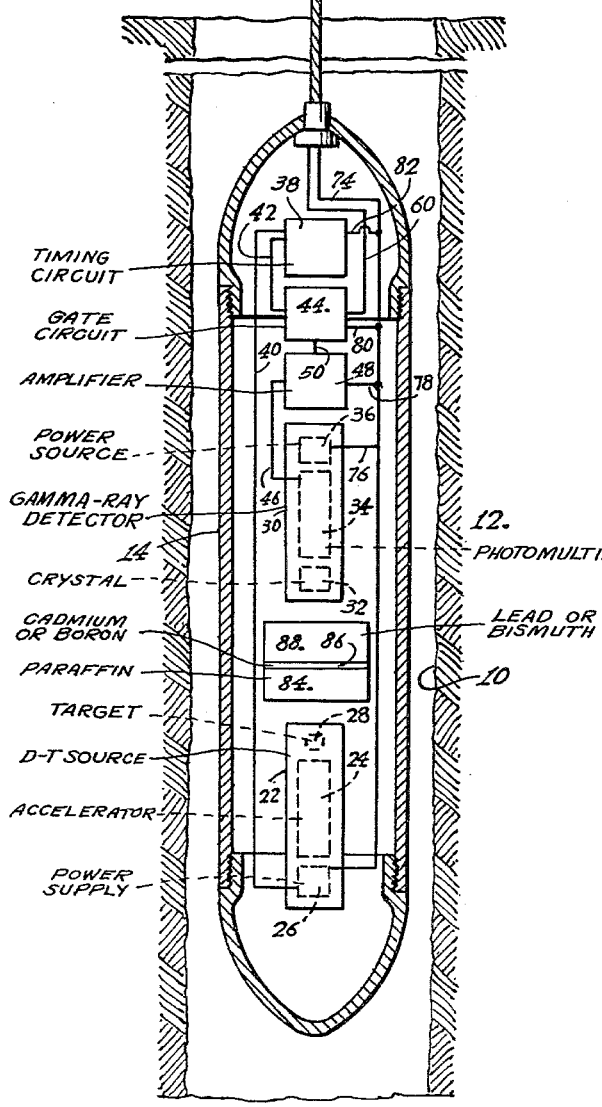
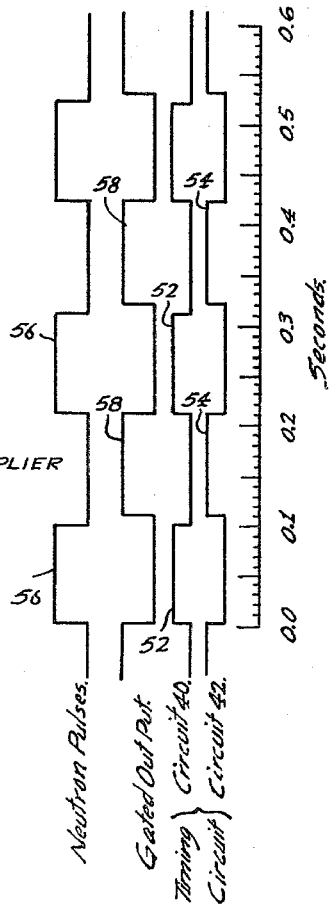
INVENTOR.
Charles W. Tittle.
BY
Horace B. Cooke
ATTORNEY.

United States Patent Office 3,184,598
Patented May 18, 1965

3,184,598
RADIOACTIVE WELL LOGGING METHOD
Charles W. Tittle, Indiana Township, Allegheny County, Pa., assignor, by mesne assignments, to Schlumberger Limited (Schlumberger N.V.), Houston, Tex., a corporation of the Netherlands
Filed May 17, 1954, Ser. No. 430,009
2 Claims. (Cl. 250—83.3)

This invention relates to a method of and apparatus for making a radiological survey of a material of uncertain composition, and pertains more particularly to alternately bombarding such material with fast neutrons and detecting gamma-rays emitted by such material. My application Serial No. 430,008, filed May 17, 1954, now abandoned, and entitled, "Method and Apparatus for Radiological Surveying," is directed to related subject matter.

The present invention is concerned with obtaining information indicative of the presence of and the concentration of selected types of atomic nuclei in a material of uncertain composition through the detection and measurement of gamma-rays that are emitted by the material as a result of fast neutron bombardment after such bombardment has ceased for a sufficient time for substantially complete disappearance of the bombarding neutrons.

Bombardment of many different types of atomic nuclei with fast neutrons will result in the production of gamma-rays. Bombardment of a material containing a variety of different types of atomic nuclei can usually be expected to result in the production of gamma-rays by a number of different mechanisms. For example, fast neutrons will react directly with certain types of atomic nuclei with such reaction being accompanied by instantaneous production of gamma-rays; upon the fast neutrons being slowed by elastic collisions to thermal energies, gamma-rays will be simultaneously produced upon capture of the slow neutrons by certain types of atomic nuclei; and fast neutrons will react with certain types of atomic nuclei to result in unstable forms of atomic nuclei that emit gamma-rays during their decay.

While useful information can be obtained indicative of the character of an unknown material by concurrently bombarding the material with fast neutrons and detecting gamma-rays emitted therefrom, it has been found that valuable information more directly correlative to the presence and concentration of certain constituents in the material can be obtained by detecting gamma-rays emitted from the material as a result of fast neutron bombardment thereof in a manner that substantially excludes the detection of gamma-rays that are the instantaneous product of reaction of the material with the bombarding neutrons. Limiting the detection of gamma-rays in such a manner emphasizes the detection of gamma-rays that are emitted during the decay of unstable atomic nuclei resulting from the neutron bombardment.

Many different types of atomic nuclei react with fast neutrons to result in various types of gamma-ray emitting, radioactive atomic nuclei, and, in general, different types of gamma-ray emitting radio-active atomic nuclei are characterized by having different half lives and by emitting gamma-rays of differing energy distribution during their decay. Although in some instances differing types of atomic nuclei can react by differing mechanisms with fast neutrons to result in a single type of gamma-active radioactive atomic nuclei, the presence of a particular type of gamma-active radioactive atomic nuclei in a material as a result of fast neutron bombardment of the material can generally be correlated with the original presence of one or at most a very limited number of particular types of atomic nuclei in the material.

Broadly, the present invention involves the detection and measurement of gamma-rays emitted by a material as a result of fast neutron bombardment in the limited manner previously set forth, the correlation of the information thus obtained to a particular type of gamma-ray emitting radioactive atomic nuclei, and the further correlation of such radioactive atomic nuclei with selected types of atomic nuclei originally present in the material.

The invention is particularly suited for obtaining information of the above described character about an extensive heterogenous material, the composition of which can vary from point to point. Inasmuch as an understanding of the principles of the invention thus applied will involve a full and complete concept thereof, the invention is hereinafter described in connection with a preferred embodiment thereof for the logging of earth formations penetrated by a borehole.

In the drawings:

FIGURE 1 schematically illustrates a preferred embodiment of the invention for logging earth formations; and, FIGURE 2 is a graphic representation of a suitable timing sequence for the apparatus shown in FIGURE 1.

Referring to FIGURE 1, the numeral 10 designates a borehole penetrating earth formations 12.

A probe housing 14 formed of a material substantially transparent to neutrons and gamma-rays, such as steel, aluminum, or magnesium, is disposed within the borehole 10 for vertical movement therein, such probe housing 14 being supported by a multiple-electric-conduit cable 16 for vertical movement. The cable 16 is carried by a power-driven reel 18 and is entrained over a supporting pulley 20.

A source of pulsed, fast neutrons 22 is provided, which comprises an ion source and accelerator 24, a power supply 26 therefor, and a target 28. The ion source and accelerator 24 is of conventional character and is preferably of the type that will accelerate deuterium ions to strike the target 28. The target 28 preferably includes tritium nuclei, and can comprise zirconium having tritium adsorbed thereon, or paraffin having some or all of its hydrogen atoms replaced by tritium as well as other possible arrangements that will occur to those skilled in the art. The arrangement is such that accelerated deuterium ions will strike the tritium nuclei of the target 28 to cause the emission of fast neutrons whose energy is approximtely 14 m.e.v. The arrangement whereby the neutrons from the source 22 are pulsed will be presently described.

A gamma-ray detector 30 is provided, preferably a combination of a scintillation phosphor 32, such as a crystal of thallium-activated sodium or calcium iodide, and a photomultiplier tube 34. A power source 36 is provided for the photomultiplier tube 34.

A timing-circuit means 38 of conventional character is provided that produces two pulsed outputs that bear a timed relation to each other. The timing-circuit means 38 is preferably such type that the frequency of the two outputs and their time relation are adjustable. One output of the timing-circuit means 38 is connected by an electric circuit 40 to the power supply 26 for controlling the operation of the neutron source 22, and the other output of the timing-circuit means 38 is connected by electric circuit 42 to a gate circuit 44 for controlling the operation of the output of the detector 30. The arrangement is such that under the control of the timing-circuit means 38, the power supply 26 of the neutron source 22 is caused to be periodically actuated for pulsing the neutrons; and, under the control of the timing-circuit means 38, the gate circuit 44 periodically will become capable of passing electrical pulses fed thereinto.

A complete understanding of the relation of the timing-circuit means 38 to the power supply 26 and the gate circuit 44 will be afforded upon considering suitable types of timing-circuit means 38, power supply 26 and gate circuit 44. The timing-circuit means 38 can simply take the form of a rotary switch (not shown) including two switch elements for association with the circuits 40 and 42, respectively.

A suitable form of power supply 26 is given by Penning and Moubis (F. M. Penning and J. H. A. Moubis, Eine Neutronenröhre ohne Pumpvorrichtung, Physica IV, No. 11, December 1937, pp. 1190–1199). The switch element of the timing-circuit means 38 associated with the circuit 40 and the power supply 26 are so related that, for example, the power supply 26 will cause ions to be delivered for 0.1 second with delivery stopped for the next 0.11 second, with such cycle repeated indefinitely.

The gate circuit 44 can simply comprise a normally nonconducting triode (not shown), that is rendered conductive during electric pulses in the circuit 42. The electric switches of the timing-circuit means 38 are so related that every pulse in the circuit 40 will be accompanied by a concurrent pulse in the circuit 42 with the pulse in the circuit 42 continuing for a predetermined time interval after the pulse in the circuit 40 has stopped.

The output of the photomultiplier tube 34 is fed by an electric circuit 46 to an amplifier 48, with the output of the amplifier 48 being fed into the input of the gate circuit 44 by an electric circuit 50.

The timed relation of the above-described pulses in circuits 40 and 42 and the resulting effects produced by the power supply 26 and the gate circuit 44 are shown in FIGURE 2. The time intervals shown are simply illustrative.

Referring to FIGURE 2, the pulses of circuits 40 and 42 are indicated at 52 and 54, respectively. The neutron pulses are indicated at 56, such pulses coinciding with the pulses 52. The timing intervals during which the gate circuit 44 is conductive are shown at 58, such intervals coinciding with the intervals of the pulses 54.

The essential relation is that the neutron source 22 is periodically pulsed with the output of the detector 30 being periodically cut off during the entire time of the neutron pulses and for a predetermined time thereafter. It will be evident to those skilled in the art that such essential timing control can be achieved by means other than the particular one previously described. Such timing control can be achieved by purely electronic means or by a combination of electromechanical means and electronic means, neither of which is shown.

The output of the gate circuit 44, which is controlled by the timing-circuit means 38 in the manner previously described, is fed through an electric circuit 60 through the cable 16 to the reel 18. The electric circuit 60 is electrically coupled to a pick-up circuit 62 that feeds the output of the gate circuit 44 into the input of recording means 64.

The recording means 64 can be of conventional character and is preferably of the type that incorporates a pulse height analyzer or kicksorter, whereby only electrical pulses of a predetermined height or range of heights are recorded. Conventional means is provided for relating the recording means 64 to the vertical position of the probe housing 14, such means being indicated schematically by dashed line 66 connecting the pulley 20 to the recording means 64, whereby records produced by the recording means 64 can be correlated to particular portions of the earth formations 12. Alternatively, the recording means 64 can conveniently comprise the recording means disclosed in my copending and coassigned application Serial No. 400,956, filed December 29, 1953, and entitled, "Logging of Energy Distribution," whereby a continuous film record of the energy distribution of detected gamma-rays can be obtained.

Means is provided for supplying electrical energy to the above-described components. Such means can comprise a main power supply 68 connected to the recording means 64 by circuit means 70. The power supply 68 is also connected by suitable conventional arrangements to circuit means 72 associated with the cable 16 and the reel 18 that includes a circuit element 74 within the probe housing 14. The circuit element 74 is connected to the power supply 26 and is provided with branches 76, 78, 80 and 82 connected to the power supply 36 of the photomultiplier tube 34, the amplifier 50, the timing-circuit means 38 and the gate circuit 44, respectively, for energization thereof. In another possible arrangement, the circuit elements 60 and 74 are actually a common circuit element, with conventional means provided for separating the signal pulses from the power-supply frequency. Alternatively, though not shown, batteries may be carried in the probe housing 14 for energizing one or more of the components contained therein.

Although not essential, it is preferred to avoid unnecessary exposure of the detector 30 to neutrons, etc. This can be effectively accomplished by interposing a composite shielding between the neutron source 22 and the detector 30, such shielding comprising, for example, paraffin 84, cadmium or boron 86 and lead or bismuth 88.

The operation of the apparatus will now be described. During vertical movement of the probe housing 14, the same progressively is brought into juxtaposition with different, vertically-spaced portions of the earth formations 12. With respect to each portion of earth formation 12 during the time it is in juxtaposition with the probe housing 14, the portion of earth formation is periodically subjected to fast neutron bombardment. Such bombardment will cause gamma-rays to be emitted by the bombarded portion of earth formation. Some of such gamma-rays enter the borehole 10 and are detected by the detector 30. However, due to the above-described operation of the gate circuit 44 only such gamma-rays are recorded by the recording means 64 as are detected during periodic intervals commencing a predetermined time interval (by which is meant sufficient time for substantial disappearance of the primary incident neutrons) after cessation of a pulse of fast neutrons and ending with or before the start of the next pulse of neutrons. Such operation results in the recording of only such gamma-rays that are detected after substantially all primary neutrons from the neutron source 22 have disappeared. The peculiar significance of records so obtained will be understood presently.

The intensity and energy distribution of gamma-rays recorded by the recording means 64 is, among other things, a function of the vertical velocity of the probe housing 14, the particular time relations established by the timing-circuit means 38, characteristics of the source 22 and the detector 30, and the particular character of the earth formations 12 surrounding the probe housing. In general, all such variables, except those concerning the formation and borehole characteristics, can be made essentially constant, so that the intensity and energy distribution of recorded gamma-rays can be made to vary essentially only as a function of the character of the earth formations 12 surrounding the probe housing 14 at any particular time, except for minor corrections for borehole conditions, i.e., diameter of the borehole, nature of fluid in the borehole, and presence or absence of steel casing and cement.

Even though little or nothing is known about the character of the earth formations 12, the records obtained from the recording means 64 can be of very great assistance in determining at least some important properties or characteristics of the earth formations 12. Usually, notwithstanding the previous level of understanding as to the nature of such earth formations 12, such level of understanding can be raised by intelligent interpretation of the records obtained by the recording means 64.

Records obtained by the recording means 64 are interpreted in the light of such data as are presented in the accompanying Tables I through III. Tables I through III set forth the gamma-active radioisotopes produced by neutrons reacting with common elements. Tables I through III are not complete, but are sufficient for the purpose at hand inasmuch as they take into account most of the common elements that will ordinarily be encountered in substantial concentration in boreholes. Specifically, Tables I through III deal with gamma-active radioisotopes formed as a result of (n,p), (n,α), and slow neutron capture reactions. The information in these tables was compiled from data taken from National Bureau of Standards Circular 499, United States Department of Commerce, and its supplements, and the Table of Isotopes by J. M. Hollander, I. Perlman, and G. T. Seaborg, UCRL–1928 Revised, University of California, December 1952.

TABLE I (n,p) Reactions producing gamma-emitting radioisotopes

| Bombarded element | Radioisotope produced | Half life | Energy of gamma-ray | Percent of disintegrations producing γ-ray |
|---|---|---|---|---|
| Oxygen | $N^{16}$ | 7.35 sec | 6.13 m.e.v. | 75 |
|  |  |  | 7.1 | 6 |
| Fluorine | $O^{19}$ | 29 sec | 1.6 | 70 |
| Neon | $F^{20}$ | 12 sec | 1.63 | 100 |
| Magnesium | $Na^{24}$ | 15 hr | 2.76 | 100 |
|  |  |  | 1.38 | 100 |
|  | $Na^{25}$ | 61 sec | 0.5–1 | weak |
| Aluminum | $Mg^{27}$ | 10 min | 1.01 | 20 |
|  |  |  | 0.84 | 100 |
| Silicon | $Al^{28}$ | 2.4 min | 1.8 | 100 |
|  | $Al^{29}$ | 6.7 min | 2.3 | 25 |
|  |  |  | 1.2 | 75 |
| Sulfur | $P^{34}$ | 12 sec | 1.9 | 25 |
| Chlorine | $S^{37}$ | 5.0 min | 2.7 | 90 |
| Vanadium | $Ti^{51}$ | 5.8 min | 0.32 | ? |
| Chromium | $V^{52}$ | 3.7 min | 1.45 | ? |
| Iron | $Mn^{56}$ | 2.6 hr | 0.82 | 100 |
|  |  |  | Others |  |
| Nickel | $Co^{60m}$ | 10 min | 0.06 m.e.v. | 99 |
| Copper | $Ni^{65}$ | 2.6 hr | 1.49 | 15 |
|  |  |  | 1.12 | 14 |
|  |  |  | 0.37 | 15 |
| Zinc | $Cu^{64}$ | 13 hr | 1.34 | 0.5 |
|  | $Cu^{66}$ | 5.2 min | 1.04 | 7 |
| Arsenic | $Ge^{75m}$ | 45 sec | 0.175 | ? |
|  | $Ge^{75}$ | 79 min | Various |  |
| Selenium | $As^{76}$ | 90 min | 0.27 | ? |
| Molybdenum | $Nb^{97m}$ | 60 sec | 0.75 | 100 |
|  | $Nb^{97}$ | 72 min | 0.67 | 100 |
| Ruthenium | $Tc^{100}$ | 16 sec | 0.55 | ? |
|  | $Tc^{101}$ | 14 min | 0.31 | ? |
| Tungsten | $Ta^{182}$ | 111 days | Many |  |
| Mercury | $Au^{198}$ | 2.7 days | 0.411 | 99 |
|  | $Au^{199}$ | 3.2 days | Various |  |
|  | $Au^{200}$ | 48 min | 1.13, 0.39 | ? |
| Lead | $Tl^{207}$ | 4.8 min | 0.87 | 0.5 |
|  | $Tl^{208}$ | 3.1 min | 2.614 | 100 |

TABLE II (n,α) Reactions producing gamma-emitting radioisotopes

| Bombarded element | Radioisotope produced | Half life | Energy of gamma-ray | Percent of disintegrations producing γ-ray |
|---|---|---|---|---|
| Fluorine | $N^{16}$ | 7.35 sec | 6.3 m.e.v. | 75 |
|  |  |  | 7.1 | 6 |
| Sodium | $F^{20}$ | 12 sec | 1.63 | 100 |
| Aluminum | $Na^{24}$ | 15 hr | 2.75 | 100 |
|  |  |  | 1.38 | 100 |
| Silicon | $Mg^{27}$ | 10 min | 1.01 | 20 |
|  |  |  | 0.84 | 100 |
| Phosphorus | $Al^{28}$ | 2.4 min | 1.8 | 100 |
| Chlorine | $P^{34}$ | 12 sec | 1.9 | 25 |
| Manganese | $V^{52}$ | 3.7 min | 1.45 | ? |
| Cobalt | $Mn^{56}$ | 2.6 hr | 0.82 | 100 |
|  |  |  | Others |  |
| Copper | $Co^{60m}$ | 10 min | 0.06 | 99 |
| Zinc | $Ni^{65}$ | 2.6 hr | 1.49 | 15 |
|  |  |  | 1.12 | 14 |
|  |  |  | 0.37 | 15 |
| Gallium | $Cu^{66}$ | 5.2 min | 1.04 | 7 |
| Selenium | $Ge^{75}$ | 79 min | Various |  |
| Bromine | $As^{76}$ | 26 hr | Various |  |
|  | $As^{78}$ | 90 min | 0.27 | ? |
| Barium | $Xe^{135m}$ | 15 min | 0.52 | 100 |
|  | $Xe^{135}$ | 9.1 hr | 0.25 | 100 |

TABLE III

Slow neutrons capture reactions producing gamma-emitting radioisotopes

| Bombarded element | Radioisotope produced | Half life | Energy of gamma-ray | Percent of disintegrations producing γ-ray |
|---|---|---|---|---|
| Aluminum | $Al^{28}$ | 2.4 min | 1.8 m.e.v. | 100 |
| Chlorine | $Cl^{38}$ | 37.5 min | 1.6 | 31 |
|  |  |  | 2.15 | 47 |
| Sodium | $Na^{24}$ | 15 hr | 2.75 | 100 |
|  |  |  | 1.38 | 100 |
| Magnesium | $Mg^{27}$ | 10 min | 1.01 | 20 |
|  |  |  | 0.84 | 100 |
| Potassium | $K^{42}$ | 12.4 hr | 1.51 | 20 |
| Scandium | $Sc^{46}$ | 20 sec | 0.14 | 100 |
| Titanium | $Ti^{51}$ | 5.8 min | 0.32 | ? |
| Vanadium | $V^{52}$ | 3.7 min | 1.45 | ? |
| Manganese | $Mn^{56}$ | 2.6 hr | 0.82 | 100 |
|  |  |  | Others |  |
| Cobalt | $Co^{6m}$ | 10 min | 0.06 | 99 |
|  | $Co^{60}$ | 5.3 yr | 1.17 | 100 |
|  |  |  | 1.33 | 100 |
| Nickel | $Ni^{65}$ | 2.6 hr | 1.49 | 15 |
|  |  |  | 1.12 | 14 |
|  |  |  | 0.37 | 15 |
| Copper | $Cu^{64}$ | 13 hr | 1.34 | 0.5 |
|  | $Cu^{66}$ | 5.2 min | 1.04 | 7 |
| Rhodium | $Rh^{104}$ | 44 sec | 0.04 | ? |
|  |  |  | 0.18 | ? |
|  |  |  | 0.95 | ? |
| Indium | $In^{116}$ | 54 min | Various |  |
| Iodine | $I^{128}$ | 25 min | 0.43 | 7 |
| Barium | $Ba^{139}$ | 85 min | 0.16 | 26 |
| Dysprosium | $Dy^{165m}$ | 1.25 min | 0.11 | ? |
|  | $Dy^{165}$ | 140 min | Various |  |
| Tungsten | $W^{187}$ | 24 hr | Various |  |
| Gold | $Au^{198}$ | 2.7 days | 0.411 | 99 |

An important interpretation of the records produced by the recording means 64 has to do with the variation of oxygen concentration in the earth formations 12 with depth. The oxygen interpretation can be further correlated in many instances with the particular nature of the earth formations, and is of great value in locating oil, oil-water interfaces, etc. The manner of making such an interpretation of the records will be described in view of its simplicity and for the reason that such an interpretation requires essentially no advance knowledge of the character of the earth formations 12.

Although different timing arrangements can and quite probably will be necessary for other determinations, an oxygen determination can be obtained when the neutron pulses are spaced 0.11 second apart and are of 0.1 second duration, with the gate circuit 44 being conductive from 0.01 second after cessation of a neutron pulse to the beginning of the next neutron pulse. Even this timing arrangement for oxygen determinations is subject to modification, it being essential only that the gate circuit 44 be nonconductive for a time sufficient for almost all primary neutrons to disappear.

It will be noted on referring to Tables I through III that $N^{16}$ can be made by at least two processes

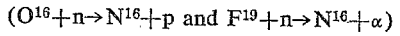

$$(O^{16}+n \rightarrow N^{16}+p \text{ and } F^{19}+n \rightarrow N^{16}+\alpha)$$

and that the same has a short half life and produces in 75 percent of its disintegrations a gamma-ray of about 6.13 m.e.v. Of the gamma-rays recorded according to the method outlined above, the intensity of the gamma-rays of about 6.13 m.e.v. can with reasonable precision be attributed to the quantities of the common isotope of oxygen ($O^{16}$) and the single isotope $F^{19}$ present in the earth formations 12. Since fluorine occurs principally in the mineral fluorite ($CaF_2$) and to some extent in micas and apatites, the 6.13 m.e.v. gamma-rays can usually be attributed to substantially only oxygen rather than fluorine or fluorine and oxygen.

Since relatively low concentrations of oxygen and/or fluorine are believed most frequently to be associated with the presence of oil, no objection ordinarily arises because of confusion of fluorine and oxygen insofar as the oil seeker is concerned. If such possible confusion is objectionable for any reason, it may be adequately eliminated by taking advantage of the fact that $F^{19}$ also undergoes a (n,p) reaction with good probability (cross section 0.12 barn) to yield $O^{19}$. $O^{19}$ has a half life of 29 seconds and in 70 percent of its disintegrations gives a gamma-ray of 1.6 m.e.v. Accordingly, the intensity of 1.6 m.e.v. gamma-rays gives a reasonable indication of the concentration of fluorine present, considering the half lives of other 1.6 m.e.v. gamma-active radioisotopes that may be present.

It is preferred that a separate run of the apparatus through the borehole be made to determine fluorine concentration with a somewhat modified timing arrangement. Such modified timing arrangement would involve a longer activation period (neutron pulses of longer duration) with about a 30 second time delay after the neutron pulse before the gate circuit 44 begins to conduct.

Thus, by measurements made with respect to the intensities of 6.13 and 1.6 m.e.v. gamma-rays recorded in the manner described, it is a relatively simple matter to distinguish oxygen from fluorine and to estimate the concentration of either such substances. The computation of estimated concentrations can be considerably simplified if calibration runs of the apparatus are made through earth formations of known character.

It is believed that the computations necessary to make such estimates are within the skill of the art and will not be dealt with specifically here; this specification being directed solely to the method and apparatus used to obtain data useful in making such calculations. Naturally, such calculations would, in distinguishing between 6.13 m.e.v. gamma-rays resulting from oxygen and fluorine, take into account such facts as the $N^{16}$ yield from fluorine is about five times as great as that from an equal quantity of oxygen.

Inasmuch as the amount of hydrogen in the earth formations will affect the intensity of fast neutrons incident on parts of the formation at various distances from the wall of the borehole, this effect will be reflected by the gamma-ray yield, and the amount of such hydrogen should be taken into consideration in determining from the records the quantity of oxygen in the earth formations. The amount of hydrogen in the earth formations can be determined by use of a conventional neutron logging device, which could readily be incorporated in the same housing with the device described in this specification and could even make use of the same neutron source and/or gamma-ray detecting apparatus, if desired. The manner in which this can be done should be readily apparent to those skilled in the art. By means of information derived from measurements in formations of known composition, either natural or artificial, corrections can then be made for the effect of hydrogen in determining the quantity of oxygen in the formation by the method discussed in this specification.

Those skilled in the art will speedily appreciate that the application of the principles of this invention is subject to wide variation without departing from the spirit of the invention. In fact, such variations between specific applications can be commensurate in scope with the variations that exist between formations examined or the previous knowledge of such formations.

For example, suppose substantially only elements X, Y and Z will cause gamma-rays of a certain energy level to be recorded according to the methods outlined above; then measurement of the intensity such gamma-rays affords fundamental information for computing the total concentration of X, Y and Z and the possible relative amounts of each. Furthermore, if the concentration of say Z is already known, then even more specific conclusions regarding X and Y can be reached.

In some circumstances within the hypothetical conditions outlined above, significant distinctions can be made between the concentrations of X, Y and Z based on the fact that the identifying gamma-rays, though of about equal energies, may emanate from different radioisotopes of differing half lives. Under such circumstances, for example, interference due to the presence of X (assuming its associated radioisotope has a relatively very short half life) can be minimized by increasing the time interval that the gate circuit 44 is nonconductive after cessation of a neutron pulse, so that the radioisotope associated with X will have substantially decreased in concentration prior to the recording or measurement of gamma-rays is commenced between the neutron pulses. Alternatively, the influence of X can be relatively increased by decreasing such time interval to as short a value as possible without making the gate circuit 44 conductive before substantially all of the primary neutrons have disappeared.

It will be appreciated that several variables are subject to control, such as the periods of neutron activation (the duration of individual neutron pulses), the delay interval following cessation of the neutron pulse prior to commencing recording gamma-rays, the duration of the detecting and recording interval, and such factors as the intensity of the neutron pulses and the rate at which the probe is moved in the borehole. In general, the rate of movement of the probe housing will be as fast as possible commensurate with a reasonable intensity level of detected gamma-rays. Utilization of neutron pulses of high intensity favors higher rates of probe movement, as will be appreciated by those skilled in this field.

The activation period employed governs to some extent the speed of probe housing movement (long activation periods indicating a need for a relatively slow rate of probe movement, and vice versa). The activation period is most suitably selected on the basis of the half life of the radioisotope, the gamma-ray of which is to be detected. If the radioisotope has a relatively short half life, the use of a relatively short period of activation is indicated, and vice versa. In every instance, the delay interval must be of sufficient duration that substantially all primary pulsed neutrons have disappeared from the earth formations, and in the event the radioisotope to be detected has a relatively long half life, such delay interval may be made relatively long so as to avoid recording the intense activity of any possible interfering radioisotope of shorter half life. The recording interval, that is, the interval during which the gate circuit 44 is conductive is a reasonable compromise between having a long interval so as to record as many gamma-rays as possible, and a short interval adapted to coincide with the relatively higher activity of the radioisotope under investigation as compared to the activity of possible interfering radioisotopes. A reasonable guide in selecting a suitable recording interval is such that the recording interval should commence after interfering radioistopes of shorter half life have largely dissipated themselves and end either before the radioisotope under investigation is seriously depleted in concentration relative to interfering radioisotopes of longer half lives or when the activity of the radioisotopes under investigation has subsided to such a low level as to be unsuitable for recording purposes. By interfering radioisotopes is meant those radioisotopes emitting gamma-rays of equal or nearly equal energy to those emitted by the radioisotope under investigation, or in any event, gamma-rays to which the detector in use is sensitive.

Although the pulsed neutrons from the source 22 have been described as being regular and periodic, it is within the concept of the present invention that the neutron pulses can be irregular if for any reason the use of irregular neutron pulses is deemed necessary or desirable. Such considerations as to the regularity of the neutron pulses also apply to the time delay intervals and the recording intervals.

Further elaboration of the method and apparatus and suggested techniques of their use is thought to be unnecessary, attention being directed to the appended claims for ascertainment of the actual scope of the invention.

I claim:

1. A method of well-logging for obtaining data of value for estimating the concentration of oxygen in formations, comprising moving a source of pulsed fast neutrons of at least about 11 m.e.v. and a gamma-ray detector along a borehole, and measuring only the gamma-rays having about 6.13 m.e.v. energy that are detected during time intervals intermediate the neutron pulses and after substantial disappearance of the primary pulsed neutrons.

2. A method of well-logging for obtaining data of value for estimating the concentration of oxygen in formations comprising moving a source of pulsed fast neutrons of at least about 11 m.e.v. and a gamma-ray detector through a borehole, and measuring only gamma-rays having energies of about 1.6 m.e.v. and 6.13 m.e.v. that are detected during time intervals intermediate the neutron pulses and after substantial disappearance of the primary pulsed neutrons.

References Cited by the Examiner
UNITED STATES PATENTS

| | | | |
|---|---|---|---|
| 2,275,748 | 3/42 | Fearon | 250—83 |
| 2,303,688 | 12/42 | Fearon | 250—83 |
| 2,489,436 | 11/49 | Salisbury | 313—61 |
| 2,648,012 | 8/53 | Scherbatskoy | 250—71 |
| 2,712,081 | 6/55 | Fearon et al. | 250—83.6 |
| 2,739,242 | 3/56 | Armistead | 250—71.5 |
| 2,769,096 | 10/56 | Frey | 250—83.6 |
| 2,905,826 | 9/59 | Bonner et al. | 250—71.5 |

RALPH G. NILSON, *Primary Examiner.*